United States Patent
Yamazaki

(10) Patent No.: US 10,942,338 B2
(45) Date of Patent: Mar. 9, 2021

(54) IMAGING LENS

(71) Applicant: KANTATSU CO., LTD., Yaita (JP)

(72) Inventor: Kaoru Yamazaki, Sukagawa (JP)

(73) Assignee: KANTATSU CO., LTD., Tochigi (JP)

( * ) Notice: Subject to any disclaimer, the term of this patent is extended or adjusted under 35 U.S.C. 154(b) by 100 days.

(21) Appl. No.: 16/254,092

(22) Filed: Jan. 22, 2019

(65) Prior Publication Data

US 2019/0391366 A1    Dec. 26, 2019

Related U.S. Application Data

(63) Continuation of application No. 15/996,135, filed on Jun. 1, 2018, now abandoned.

(30) Foreign Application Priority Data

Jun. 2, 2017    (JP) .............................. JP2017-110501

(51) Int. Cl.
G02B 13/00    (2006.01)
G02B 9/60    (2006.01)

(52) U.S. Cl.
CPC ........... *G02B 13/0045* (2013.01); *G02B 9/60* (2013.01)

(58) Field of Classification Search
CPC .............................. G02B 13/0045; G02B 9/60
See application file for complete search history.

(56) References Cited

U.S. PATENT DOCUMENTS

| 9,158,094 | B1 | 10/2015 | Chen et al. |
| 10,564,394 | B2 * | 2/2020 | Sekine ............... G02B 27/0037 |
| 2013/0335588 | A1 | 12/2013 | Matsusaka |
| 2016/0091696 | A1 * | 3/2016 | Lin .................... G02B 13/0045 |
| | | | 359/714 |

FOREIGN PATENT DOCUMENTS

| CN | 104914558 A | 9/2015 |
| JP | 5370619 B | 9/2013 |
| JP | 2016-031531 A | 3/2016 |

* cited by examiner

*Primary Examiner* — Wen Huang
(74) *Attorney, Agent, or Firm* — Hamre, Schumann, Mueller & Larson, P.C.

(57) ABSTRACT

There is provided an imaging lens with high-resolution which satisfies the wide field of view, the low-profileness and the low F-number in well balance, and excellently corrects aberrations. An imaging lens comprises in order from an object side to an image side, a first lens having negative refractive power, an aperture stop, a second lens, a third lens being a double-aspheric lens, a fourth lens having positive refractive power, and a fifth lens being a double-sided aspheric lens, wherein a below expression is satisfied:

$$-0.07<(N1-1)/(r1\times f)\times 1000<0.07$$

where
N1: refractive index at d-ray of the first lens,
r1: curvature radius of the object-side surface of the first lens,
f: focal length of the overall optical system.

19 Claims, 11 Drawing Sheets

IMAGING LENS

The present application is based on and claims priority of a Japanese patent application No. 2017-110501 filed on Jun. 2, 2017, the entire contents of which are hereby incorporated by reference.

BACKGROUND OF THE INVENTION

Field of the Invention

The present invention relates to an imaging lens which forms an image of an object on a solid-state image sensor such as a CCD sensor or a C-MOS sensor used in an imaging device.

Description of the Related Art

In recent years, it becomes common that camera function is mounted in a home appliance, information terminal equipment, an automobile and public transportation. Demand of products with the camera function is more increased, and development of products is being made accordingly.

As a conventional imaging lens mounted in such equipment, for example, the imaging lens disclosed in Patent Documents 1 to 3 has been known.

Patent Document 1 (JP Patent No. 5370619B) discloses an imaging lens aiming at being compact and properly correcting aberrations, and comprising, in order from an object side to an image side, a first lens having positive refractive power as a whole, a second lens having negative refractive power as a whole, a third lens having the positive refractive power as a whole, and a fourth lens having the negative refractive power as a whole, wherein a surface position at a maximum effective diameter of an object-side surface and an image-side surface of the second lens is located on the object side than a surface vertex thereof, and the fourth lens has an aspherical surface in a contour of a cross section taken along and through an optical axis, and the aspherical surface has an inflection point in a direction from the optical axis to an end of an effective area.

Patent Document 2 (CN Publication No. 104914558A) discloses an imaging lens comprising, in order from an object side, a first lens having positive refractive power, a second lens having negative refractive power, a third lens having the positive refractive power, a fourth lens having the positive refractive power, and a fifth lens having the negative refractive power, and aiming at wide field of view, high performance and low-profileness.

Patent Document 3 (JP Publication 2016-31531A) discloses an imaging lens comprising, in order from an object side to an image side along an optical axis, a first lens element, a second lens element, a third lens element, a fourth lens element, a fifth lens element and a sixth lens element, each of which has an object-side surface facing an object side and an image-side surface facing an image side and refractive power, and maintaining proper optical performance and shortening an overall length.

SUMMARY OF THE INVENTION

The imaging lens disclosed in the Patent Document 1 relatively realizes the low-profileness, however there are problems on low F-number and wide field of view. The imaging lens disclosed in the Patent Document 2 has problems on the wide field of view.

The imaging lens disclosed in the Patent Document 3 has problems on the low-profileness In lens configurations disclosed in the Patent Documents 1 to 3, when all requirements of the wide field of view, the low F-number and the low-profileness as demanded in recent years are to be realized, it is very difficult to correct aberrations at a peripheral area, and excellent optical performance can not be obtained.

The present invention has been made in view of the above-described problems, and an object of the present invention is to provide an imaging lens with high resolution which satisfies demand of the wide field of view, the low-profileness and the low F-number in well balance and excellently corrects aberrations.

Here, "wide field of view" implies that a half field of view in a range capable of photographing is 50 degrees or more (namely the field of view is 100 degrees or more). "Low profileness" implies that total track length is less than 5.5 mm, and a ratio of total track length to diagonal length is less than 1.0. "Low F-number" implies to have value of 2.5 or less.

Regarding terms used in the present invention, "a convex surface", "a concave surface" or "a plane surface" of lens surface implies that a shape of the lens surface near an optical axis (paraxial portion). "Refractive power" implies the refractive power near the optical axis. "A pole point" implies an off-axial point on an aspheric surface at which a tangential plane intersects the optical axis perpendicularly. "Total track length" is defined as a distance along the optical axis from an object-side surface of an optical element located closest to the object to an image plane. "The total track length" is a distance obtained when thickness of an IR cut filter or a cover glass which may be arranged between the imaging lens and the image plane is converted into an air-converted distance.

An imaging lens according to the present invention comprises, in order from an object side to an image side, a first lens having negative refractive power, an aperture stop, a second lens, a third lens being a double-aspheric lens, a fourth lens having positive refractive power, and a fifth lens being a double-sided aspheric lens.

In the imaging lens having the above-described configuration, the first lens emits light ray in a manner that an angle of the light ray entered from wide area is close to parallel to the optical axis by having the negative refractive power, and the light ray enters the second lens.

The second lens and the third lens correct spherical aberration and chromatic aberration occurred at the first lens. Furthermore, the third lens effectively corrects astigmatism and coma aberration by forming as the double-sided aspheric lens.

The fourth lens realizes the low-profileness and corrects the astigmatism and field curvature by having the positive refractive power.

The fifth lens corrects distortion, the field curvature and the astigmatism, and controls an incident angle of the light ray to the image sensor, by forming as the double-sided aspheric lens.

The aperture stop is arranged between the first lens and the second lens, therefore facilitates correction of the aberrations and controls an incident angle of the light ray of high image height to the image sensor.

According to the imaging lens having the above-described configuration, it is preferable that a below conditional expression (1) is satisfied:

$$-0.07 < (N1-1)/(r1 \times f) \times 1000 < 0.07 \quad (1)$$

where
N1: refractive index at d-ray of the first lens,
r1: curvature radius of the object-side surface of the first lens,
f: focal length of the overall optical system.

The conditional expression (1) defines an appropriate range of refractive power of the object-side surface of the first lens. When a value is below the upper limit of the conditional expression (1), the negative refractive power of the first lens is prevented from being too small. Furthermore, an angle of the entered light ray is made to be close to parallel to the optical axis and is emitted thereafter, and the wide field of view is facilitated. On the other hand, when the value is above the lower limit of the conditional expression (1), the negative refractive power of the first lens is prevented from being too large. Furthermore, proper correction of the aberrations by the second lens to the fifth lens is facilitated. Additionally, when the conditional expression (1) is satisfied, there are provided an effect for suppressing the spherical aberration occurred at the first lens and an effect for reducing the sensitivity to the manufacturing error.

According to the imaging lens having the above-described configuration, it is preferable that the second lens has the positive refractive power. Furthermore, it is also preferable to have a convex surface facing the object side near the optical axis.

The second lens more facilitates the low-profileness by having the positive refractive power. Furthermore, the second lens distributes both the wide field of view and the low-profileness by having the convex surface facing the image side near the optical axis.

According to the imaging lens having the above-described configuration, it is preferable that the fifth lens has the negative refractive power. Furthermore, it is also preferable that the image-side surface thereof has at least one off-axial pole point.

The fifth lens appropriately secures a back focus by having the negative refractive power. By having the off-axial pole point, the fifth lens effectively corrects the field curvature and the distortion.

According to the imaging lens having the above-described configuration, it is preferable that the third lens has at least one off-axial pole point on the object-side surface or the image-side surface.

The third lens more effectively corrects the astigmatism and the coma aberration by having the off-axial pole point on the object-side surface or the image-side surface.

According to the imaging lens having the above-described configuration, it is preferable that a below conditional expression (2) is satisfied:

$$0.8 < |r9|/f < 7.0 \qquad (2)$$

where
r9: curvature radius of the object-side surface of the fifth lens,
f: focal length of the overall optical system of the imaging lens.

The conditional expression (2) defines a shape of the object-side surface of the fifth lens near the optical axis. When the value is above the lower limit of the conditional expression (2), occurrence of the spherical aberration is suppressed. On the other hand, when a value is above the lower limit of the conditional expression (2), the coma aberration is suppressed, excessive correction of the spherical aberration is suppressed, and the sensitivity to the manufacturing error is reduced.

According to the imaging lens having the above-described configuration, it is preferable that a below conditional expression (3) is satisfied:

$$-0.07 < (N2-1)/(r3 \times f) \times 1000 < 90.0 \qquad (3)$$

where
N2: refractive index at d-ray of the second lens,
r3: curvature radius of the object-side surface of the second lens,
f: focal length of the overall optical system.

The conditional expression (3) defines an appropriate range of refractive power of the object-side surface of the second lens. When the conditional expression (3) is satisfied, occurrence of the spherical aberration is suppressed and the sensitivity to the manufacturing error is reduced.

According to the imaging lens having the above-described configuration, it is preferable that a below conditional expression (4) is satisfied:

$$0.6 < f2/f < 1.5 \qquad (4)$$

where
f2: focal length of the second lens,
f: focal length of the overall optical system of the imaging lens.

The conditional expression (4) defines an appropriate range of the refractive power of the second lens. When a value is below the upper limit of the conditional expression (4), the positive refractive power of the second lens is prevented from being too small. As a result, position of composite principal point of the second lens, the third lens and the fourth lens is moved toward the object side further. Therefore, the total track length can be shortened. On the other hand, when the value is above the lower limit of the conditional expression (4), the positive refractive power of the second lens is prevented from being too large. As a result, occurrence of the spherical aberration and the coma aberration is suppressed. Furthermore, there is provided an effect for suppressing increase of the sensitivity to the manufacturing error.

According to the imaging lens having the above-described configuration, it is preferable that a below conditional expression (5) is satisfied:

$$2.5 < |f3|/f \qquad (5)$$

where
f3: focal length of the third lens,
f: focal length of the overall optical system of the imaging lens.

The conditional expression (5) defines an appropriate range of the refractive power of the third lens. When the conditional expression (5) is satisfied, increase of the sensitivity to the manufacturing error is suppressed and the chromatic aberration occurred at the second lens is properly corrected.

According to the imaging lens having the above-described configuration, it is preferable that a below conditional expression (6) is satisfied:

$$0.5 < f4/f < 1.1 \qquad (6)$$

where
f4: focal length of the fourth lens,
f: focal length of the overall optical system of the imaging lens.

The conditional expression (6) defines an appropriate range of the refractive power of the fourth lens. When a value is below the upper limit of the conditional expression (6), the positive refractive power of the fourth lens is prevented from being too small. As a result, the total track length can be shortened. On the other hand, when the value is above the lower limit of the conditional expression (6), the positive refractive power of the fourth lens is prevented from being too large. As a result, occurrence of the aberrations and increase of the sensitivity to the manufacturing error can be suppressed.

According to the imaging lens having the above-described configuration, it is preferable that a below conditional expression (7) is satisfied:

$$-1.2 < f5/f < -0.5 \qquad (7)$$

where
f5: focal length of the fifth lens,
f: focal length of the overall optical system of the imaging lens.

The conditional expression (7) defines an appropriate range of the refractive power of the fifth lens. When a value is below the upper limit of the conditional expression (7), the negative refractive power of the fifth lens is prevented from being too large. As a result, the low-profileness can be maintained. On the other hand, when the value is above the lower limit of the conditional expression (7), the negative refractive power of the fifth lens is prevented from being too small. As a result, the back focus can be appropriately secured.

According to the imaging lens having the above-described configuration, it is preferable that a below conditional expression (8) is satisfied:

$$20 < (vd1+vd2)/2 - vd3 < 50 \qquad (8)$$

where
vd1: abbe number at d-ray of the first lens,
vd2: abbe number at d-ray of the second lens,
vd3: abbe number at d-ray of the third lens.

The conditional expression (8) defines relationship of abbe numbers at d-ray of the first lens, the second lens and the third lens. When a value is below the upper limit of the conditional expression (8), an axial chromatic aberration of the light ray on a long wavelength side of the d-ray is properly corrected. On the other hand, when a value is above the lower limit of the conditional expression (8), an axial chromatic aberration of the light ray on a short wavelength side of the d-ray is properly corrected.

According to the imaging lens having the above-described configuration, it is preferable that a below conditional expression (9) is satisfied:

$$20 < |vd4 - vd5| < 50 \qquad (9)$$

where
vd4: abbe number at d-ray of the fourth lens,
vd5: abbe number at d-ray of the fifth lens.

The conditional expression (9) defines the relationship of abbe numbers at d-ray of the fourth lens and the fifth lens. When a value is below the upper limit of the conditional expression (9), an axial chromatic aberration of the light ray on a long wavelength side of the d-ray is properly corrected. On the other hand, when a value is above the lower limit of the conditional expression (9), an axial chromatic aberration of the light ray on a short wavelength side of the d-ray is properly corrected.

According to the imaging lens having the above-described configuration, it is preferable that the image-side surface of the fourth lens is convex near the optical axis.

Furthermore, it is more preferable that a below conditional expression (10) is satisfied:

$$2.3 < r7/r8 < 14.0 \qquad (10)$$

where
r7: curvature radius of the object-side surface of the fourth lens,
r8: curvature radius of the image-side surface of the fourth lens.

The conditional expression (10) defines a shape of the fourth lens near the optical axis. The range of the conditional expression (10) implies that the fourth lens has a meniscus shape of which the curvature radius of the object-side surface is larger than the curvature radius of the image-side surface. When the conditional expression (10) is satisfied, the refractive power of the fourth lens is appropriately determined. As a result, the spherical aberration and the chromatic aberration can be properly corrected while maintaining the low-profileness.

According to the imaging lens having the above-described configuration, it is preferable that the image-side surface of the fifth lens is concave near the optical axis. Furthermore, it is more preferable that a below conditional expression (11) is satisfied:

$$0.2 < r10/f < 0.7 \qquad (11)$$

where
r10: curvature radius of the image-side surface of the fifth lens,
f: focal length of the overall optical system of the imaging lens.

The conditional expression (11) defines a shape of the image-side surface of the fifth lens near the optical axis. When the conditional expression (11) is satisfied, the appropriate back focus can be secured while maintaining the low-profileness.

According to the imaging lens having the above-described configuration, it is preferable that the first lens is formed as the double-sided aspherical lens. Furthermore, it is more preferable that a below conditional expression (12) is satisfied:

$$20 < (t1/f) \times 100 < 35 \qquad (12)$$

where
t1: distance along the optical axis from the image-side surface of the first lens to the object-side surface of the second lens,
f: focal length of the overall optical system of the imaging lens.

The conditional expression (12) defines an appropriate range of the distance along the optical axis from the image-side surface of the first lens to the object-side surface of the second lens. The range of conditional expression (12) implies an appropriate interval of the lenses so that the first lens emits light ray in a manner that an angle of the light ray entering the first lens is close to parallel to the optical axis and the light ray enters the second lens. The total track length can be shortened and an excessive occurrence of the aberrations can be suppressed while maintaining the wide field of view by forming the first lens as the appropriate double-sided aspheric lens.

According to the imaging lens having the above-described configuration, it is preferable that the image-side surface of the first lens is concave near the optical axis.

Furthermore, it is more preferable that a below conditional expression (13) is satisfied:

$$-1.3 < (r2 \times 2)/f1 < -0.8 \qquad (13)$$

where
r2: curvature radius of the image-side surface of the first lens,
f1: focal length of the first lens.

The conditional expression (13) defines a relationship of the focal length and the curvature radius of the image-side surface of the first lens. When the conditional expression (13) is satisfied, an amount of sag of the image-side surface of the first lens is prevented from being too large and the appropriate refractive power can be determined. As a result, the wide field of view can be realized while maintaining the low-profileness. Furthermore, proper correction of the aberrations by the second lens to the fifth lens is facilitated.

According to the imaging lens having the above-described configuration, it is preferable that a below conditional expression (14) is satisfied:

$$0.2<d2/f<0.5 \qquad (14)$$

where
d2: thickness along the optical axis of the second lens,
f: focal length of the overall optical system of the imaging lens.

The conditional expression (14) defines an appropriate range of the thickness along the optical axis of the second lens. When the conditional expression (14) is satisfied, the refractive power of the second lens is appropriately determined. As a result, the low-profileness of the imaging lens is facilitated. Additionally, formability of the second lens is properly maintained.

According to the imaging lens having the above-described configuration, it is preferable that a below conditional expression (15) is satisfied:

$$0.30<d4/f<0.65 \qquad (15)$$

where
d4: thickness along the optical axis of the fourth lens,
f: focal length of the overall optical system of the imaging lens.

The conditional expression (15) defines an appropriate range of the thickness along the optical axis of the fourth lens. When the conditional expression (15) is satisfied, the refractive power of the fourth lens is appropriately determined. As a result, the low-profileness of the imaging lens is facilitated. Additionally, formability of the fourth lens is properly maintained.

According to the imaging lens having the above-described configuration, it is preferable that a below conditional expression (16) is satisfied:

$$1.0<f12/f<2.0 \qquad (16)$$

where
f12: composite focal length of the first lens and the second lens,
f: focal length of the overall optical system of the imaging lens.

The conditional expression (16) defines an appropriate range of the composite focal length of the first lens and the second lens. When the conditional expression (16) is satisfied, the refractive powers of the first lens and the second lens are appropriately determined. As a result, the spherical aberration and the coma aberration can be properly corrected while realizing the wide field of view.

According to the imaging lens having the above-described configuration, it is preferable that a below conditional expression (17) is satisfied:

$$0.6<TTL/(2\times ih)<1.0 \qquad (17)$$

where
TTL: total track length,
Ih: maximum image height.

The conditional expression (17) defines an appropriate range of a ratio of total track length to diagonal length. When the conditional expression (17) is satisfied, the imaging lens which sufficiently realizes the low-profileness can be obtained.

According to the imaging lens having the above-described configuration, it is preferable that the image-side surface of the fourth lens is formed as the aspheric surface. Additionally, it is more preferable that the positive refractive power becomes small as apart from the optical axis.

When the image-side surface of the fourth lens is formed in a manner that the positive refractive power becomes small as apart from the optical axis, the incident angle to the fifth lens of the light ray emitted from the fourth lens can be small, therefore the correction of field curvature and the distortion is facilitated.

According to the imaging lens having the above-described configuration, it is preferable that a below conditional expression (18) is satisfied:

$$3.5<(t4/f)\times 100<18.0 \qquad (18)$$

where
t4: distance along the optical axis from the image-side surface of the fourth lens to the object-side surface of the fifth lens,
f: focal length of the overall optical system of the imaging lens.

The conditional expression (18) defines an appropriate range of the distance along the optical axis from the image-side surface of the fourth lens to the object-side surface of the fifth lens. When the conditional expression (18) is satisfied, the total track length can be shortened and the light ray emitted from the fourth lens can enter the fifth lens with the appropriate incident angle. As a result, the excessive occurrence of the spherical aberration, the coma aberration and the distortion can be suppressed. Furthermore, the correction of the aberrations by the fifth lens becomes facilitated.

According to the imaging lens having the above-described configuration, it is preferable that a below conditional expression (19) is satisfied:

$$0.05<L1R-Sag/ED2<0.40 \qquad (19)$$

where
L1R-Sag: amount of sag at the peripheral area of the effective diameter on the image-side surface of the first lens,
ED2: effective diameter of the image-side surface of the first lens.

The Conditional expression (19) defines a condition for improving facilitation of the wide field of view and manufacturing. When the conditional expression (19) is satisfied, the light ray emitted from the first lens enters the second lens with an appropriate incident angle. Thereby, the wide field of view becomes facilitated. Furthermore, uneven thickness of the first lens is suppressed and formability is facilitated.

Effect of Invention

According to the present invention, there can be provided an imaging lens with high resolution which satisfies demand of the wide field of view, the low-profileness and the low F-number in well balance, and properly corrects aberrations.

DETAILED DESCRIPTION OF THE PREFERRED EMBODIMENT

Hereinafter, the preferred embodiment of the present invention will be described in detail referring to the accompanying drawings.

FIGS. 1, 3, 5, 7 and 9 are schematic views of the imaging lenses in Examples 1 to 5 according to the embodiments of the present invention, respectively. Since all these examples have the same basic lens configuration, the configuration of an imaging lens according to the present embodiment is explained mainly referring to the schematic view of Example 1.

Figure 1:
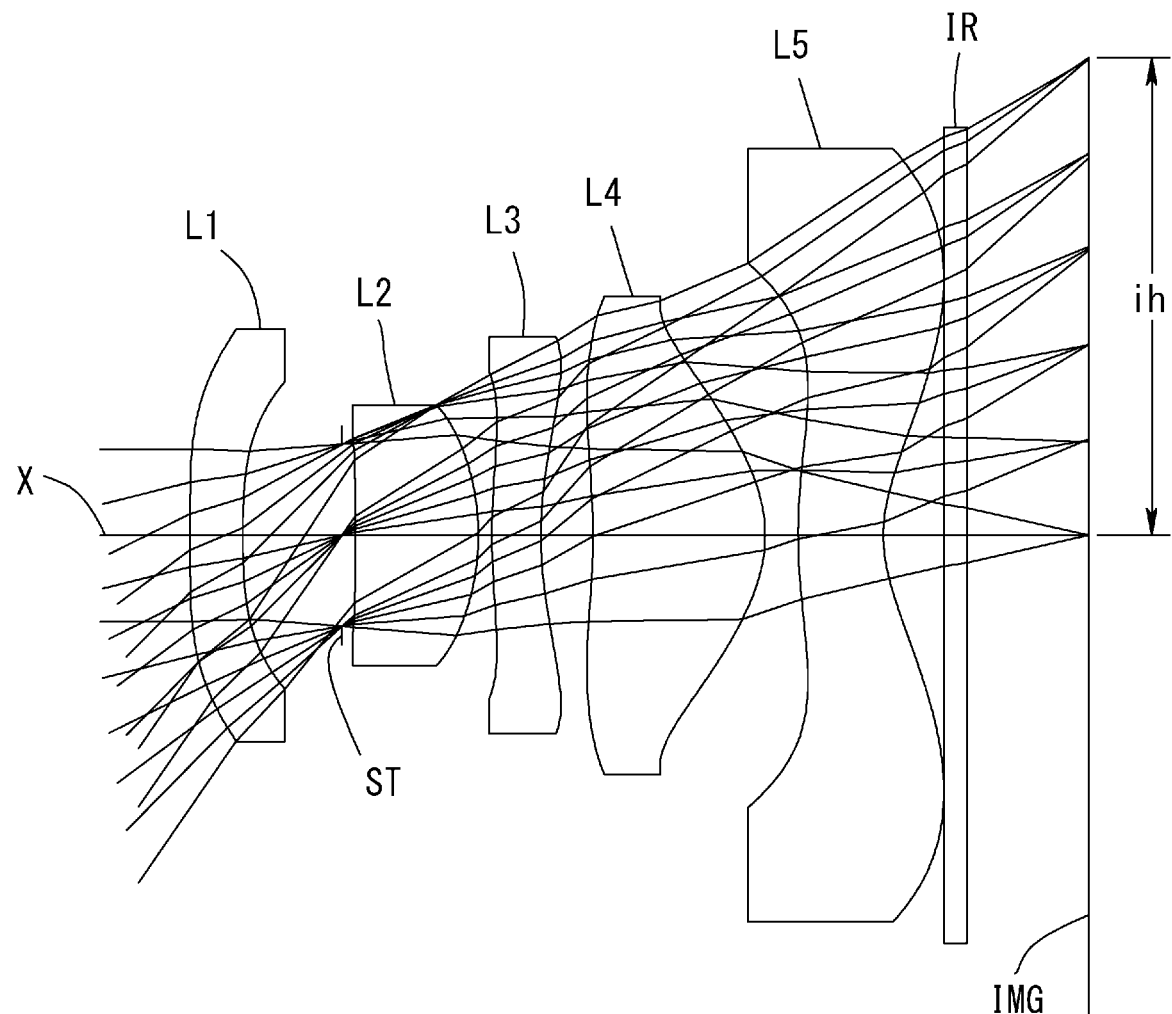
FIG. 1 is a schematic view showing a general configuration of an imaging lens in Example 1 according to the present invention.

As shown in FIG. 1, the imaging lens according to this embodiment comprises, in order from an object side to an image side, a first lens L1 having negative refractive power, an aperture stop ST, a second lens L2, a third lens L3 being a double-aspheric lens, a fourth lens L4 having positive refractive power, and a fifth lens L5 being a double-sided aspheric lens.

A filter IR such as an IR cut filter and a cover glass is arranged between the fifth lens L5 and an image plane IMG. The filter IR is omissible.

The first lens L1 has the negative refractive power, and occurrence of aberrations is suppressed by aspheric surfaces formed on both surfaces and wide field of view of the imaging lens is realized. The first lens L1 has a plane object-side surface and a concave image-side surface near the optical axis X. Thus configured, the first lens L1 emits light ray in a manner that an angle of the light ray entered from wide area is close to parallel to the optical axis, and the light ray enters the second lens L2. A shape of the object-side surface of the first lens L1 is not limited to the plane surface near the optical axis X and various shape can be used within a scope keeping an effect that the light ray enters the second lens L2 with an appropriate incident angle. The Example 4 shows an example in which a convex surface near the optical axis X is used, and the Example 5 shows an example in which the concave surface near the optical axis X is used.

Furthermore, the first lens L1 satisfies the a below conditional expression (a):

$$|r1| > |r2| \tag{a}$$

where
r1: curvature radius of the object-side surface of the first lens
r2: curvature radius of the image-side surface of the first lens The second lens L2 has positive refractive power, and occurrence of spherical aberration and coma aberration is suppressed by aspheric surfaces formed on both surfaces and low-profileness of the imaging lens is realized. The second lens L2 has a plane object-side surface and a convex image-side surface near the optical axis X. Thus configured, the second lens L2 realizes both the wide field of view and the low-profileness of the imaging lens while suppressing the occurrence of spherical aberration. A shape of the object-side surface of the second lens L2 is not limited to the plane surface near the optical axis X and the convex surface or the concave surface near the optical axis X may be adopted as shown in the Example 2.

Furthermore, the second lens L2 satisfies the a below conditional expression (b):

$$|r3| > |r4| \tag{b}$$

where
r3: curvature radius of the object-side surface of the second lens L2,
r4: curvature radius of the image-side surface of the second lens L2.

The third lens L3 has a meniscus shape having the convex surface facing the object side near the optical axis X, and having the negative refractive power. The chromatic aberration, the astigmatism and the coma aberration occurred at the second lens L2 are properly corrected by the aspheric surfaces formed on both surfaces. Furthermore, the object-side surface and the image-side surface are aspheric surfaces having at least one pole point, and the aberrations at a peripheral area are more properly corrected.

In the Example, the third lens L3 according to the present embodiment has a meniscus shape having the convex surface facing the object side near the optical axis X, and having the negative refractive power, however, various options of the refractive power and the shape near the optical axis can be adopted. When the third lens L3 has the positive refractive power, the low-profileness is facilitated. When a lens has plane surfaces both on the object side and the image side and has no substantial refractive power near the optical axis, the aberrations at the peripheral area are effectively improved by an effect of the aspheric surfaces without changing focal lengths of the overall optical system of the imaging lens, and so on.

Furthermore, the third lens L3 satisfies the a below conditional expression (c):

$$|r5| > |r6| \tag{c}$$

where
r5: curvature radius of the object-side surface of the third lens L3,
r6: curvature radius of the image-side surface of the third lens L3.

The fourth lens L4 has a meniscus shape having the convex surface facing the image side near the optical axis X, and having the positive refractive power. The low-profileness is realized by appropriately balancing the positive refractive power and the second lens L2. The astigmatism and the field curvature are corrected by the aspheric surfaces formed on both surfaces. Furthermore, the convex image-side surface of the fourth lens L4 is formed as the aspheric surface which the positive refractive power becomes small as apart from the optical axis X. As a result, an incident angle to the fifth lens L5 of the light ray emitted from the fourth lens L4 is controlled to be small, and the field curvature and the distortion are properly corrected. Additionally, the fourth lens L4 is formed as a double-side aspheric lens which the object-side surface and the image-side surface have at least one pole point at the peripheral area. Therefore, the coma aberration, the astigmatism and the field curvature are properly corrected.

Furthermore, the fourth lens L4 satisfies the a below conditional expression (d):

$$|r7|>|r8| \tag{d}$$

where
r7: curvature radius of the object-side surface of the fourth lens L4,
r8: curvature radius of the image-side surface of the fourth lens L4.

The fifth lens L5 has a meniscus shape having the convex surface facing the object side and the concave surface facing the image side near the optical axis X, and having the negative refractive power. A back focus is secured while maintaining the low-profileness of the imaging lens. Furthermore, the field curvature and the distortion are corrected by the aspheric surfaces formed on both surfaces, and the light ray incident angle to the image sensor is controlled. The aspheric surface of the image-side surface of the fifth lens L5 has at least one pole point at the peripheral area. Namely, the surface changes to the convex surface at an area apart from the optical axis, and maintains the convex surface up to the peripheral area of the effective diameter. By providing such aspheric surface, the field curvature is more properly corrected and the light ray incident angle to the image sensor is more properly controlled.

Furthermore, the fifth lens L5 satisfies the a below conditional expression (e):

$$|r9|>|r10| \tag{e}$$

where
r9: curvature radius of the object-side surface of the fifth lens L5,
r10: curvature radius of the image-side surface of the fifth lens L5.

An aperture stop ST is arranged between the first lens L1 and the second lens L2. In such construction, it is easy to correct the aberrations, and both proving a compact imaging lens and properly correcting the aberrations are realized.

Regarding the imaging lens according to the present embodiments, all lenses are single lenses and the appropriate aspheric surfaces are formed on both sides. Therefore, it becomes easy to increase the number of the aspheric surfaces in comparison with a case that the cemented lens is used, the aberrations can be properly corrected.

Use of a spherical surface or the aspheric surface on the lens surface may be determined taking performance as demanded or manufacturing easiness into consideration.

Furthermore, the imaging lens according to the present embodiments makes manufacturing facilitated by using plastic material for all lenses, and mass production in a low cost can be realized.

The material applied to the lens is not limited to the plastic material, but glass material is available. By using the glass material, further high performance may be aimed.

The imaging lens according to the present embodiments shows preferable effect by satisfying the below conditional expressions (1) to (19), and (a) to (e).

$$-0.07<(N1-1)/(r1 \times f) \times 1000<0.07 \tag{1}$$

$$0.8<|r9|/f<7.0 \tag{2}$$

$$-0.07<(N2-1)/(r3 \times f) \times 1000<90.0 \tag{3}$$

$$0.6<f2/f<1.5 \tag{4}$$

$$2.5<|f3|/f \tag{5}$$

$$0.5<f4/f<1.1 \tag{6}$$

$$-1.2<f5/f<-0.5 \tag{7}$$

$$20<(vd1+vd2)/2-vd3<50 \tag{8}$$

$$20<|vd4-vd5|<50 \tag{9}$$

$$2.3<r7/r8<14.0 \tag{10}$$

$$0.2<r10/f<0.7 \tag{11}$$

$$20<(t1/f) \times 100<35 \tag{12}$$

$$-1.3<(r2 \times 2)/f1<-0.8 \tag{13}$$

$$0.2<d2/f<0.5 \tag{14}$$

$$0.30<d4/f<0.65 \tag{15}$$

$$1.0<f12/f<2.0 \tag{16}$$

$$0.6<TTL/(2 \times ih)<1.0 \tag{17}$$

$$3.5<(t4/f) \times 100<18.0 \tag{18}$$

$$0.05<L1R-Sag/ED2<0.40 \tag{19}$$

$$|r1|>|r2| \tag{a}$$

$$|r3|>|r4| \tag{b}$$

$$|r5|>|r6| \tag{c}$$

$$|r7|>|r8| \tag{d}$$

$$|r9|>|r10| \tag{e}$$

where
N1: refractive index at d-ray of the first lens L1,
N2: refractive index at d-ray of the second lens L2,
f: focal length of the overall optical system,
f1: focal length of the first lens L1,
f2: focal length of the second lens L2,
f3: focal length of the third lens L3,
f4: focal length of the fourth lens L4,
f5: focal length of the fifth lens L5,
f12: composite focal length of the first lens L1 and the second lens L2,
r1: curvature radius of the object-side surface of the first lens L1,
r2: curvature radius of the image-side surface of the first lens L1,
r3: curvature radius of the object-side surface of the second lens L2, r4: curvature radius of the image-side surface of the second lens L2, r5: curvature radius of the object-side surface of the third lens L3, r6: curvature radius of the image-side surface of the third lens L3, r7: curvature radius of the object-side surface of the fourth lens L4, r8: curvature radius of the image-side surface of the fourth lens L4, r9: curvature radius of the object-side surface of the fifth lens L5, r10: curvature radius of the image-side surface of the fifth lens L5, vd1: abbe number at d-ray of the first lens L1, vd2: abbe number at d-ray of the second lens L2, vd3: abbe number at d-ray of the third lens L3, vd4: abbe number at d-ray of the fourth lens L4, vd5: abbe number at d-ray of the fifth lens L5, t1: distance along the optical axis X from the image-side surface of the first lens L1 to the object-side surface of the second lens L2, t4: distance along the optical axis X from the image-side surface of the fourth lens L4 to the object-side surface of the fifth lens L5, d2: thickness along the optical axis of the second lens L2, d4: thickness along the optical axis of the fourth lens L4, TTL: total track length, Ih: maximum image height, L1R-Sag: amount of sag at the peripheral area of the effective diameter on the image-side surface of the first lens L1, ED2: effective diameter of the image-side surface of the first lens L1.

In the imaging lens according to the present embodiments, it is preferable to satisfy the above all conditional expressions, however, by satisfying the conditional expression individually, operational advantage corresponding to each conditional expression can be obtained.

The imaging lens according to the present embodiments shows further preferable effect by satisfying the below conditional expressions (1a) to (19a).

$$-0.03 < (N1-1)/(r1 \times f) \times 1000 < 0.03 \quad (1a)$$

$$0.95 < |r9|/f < 5.00 \quad (2a)$$

$$-0.07 < (N2-1)/(r3 \times f) \times 1000 < 0.07 \quad (3a)$$

$$0.85 < f2/f < 1.30 \quad (4a)$$

$$3.0 < |f3|/f \quad (5a)$$

$$0.60 < f4/f < 0.85 \quad (6a)$$

$$-1.0 < f5/f < -0.7 \quad (7a)$$

$$25 < (vd1+vd2)/2 - vd3 < 40 \quad (8a)$$

$$25 < |vd4-vd5| < 40 \quad (9a)$$

$$3.5 < r7/r8 < 12.0 \quad (10a)$$

$$0.30 < r10/f < 0.55 \quad (11a)$$

$$24 < (t1/f) \times 100 < 32 \quad (12a)$$

$$-1.1 < (r2 \times 2)/f1 < -0.9 \quad (13a)$$

$$0.25 < d2/f < 0.40 \quad (14a)$$

$$0.40 < d4/f < 0.52 \quad (15a)$$

$$1.2 < f12/f < 1.5 \quad (16a)$$

$$0.85 < TTL/(2 \times ih) < 1.00 \quad (17a)$$

$$4.0 < (t4/f) \times 100 < 16.0 \quad (18a)$$

$$0.10 < L1R-Sag/ED2 < 0.25 \quad (19a)$$

The signs in the above conditional expressions have the same meanings as those in the paragraph before the preceding paragraph.

In this embodiment, the aspheric shapes of the surfaces of the aspheric lens are expressed by Equation 1, where Z denotes an axis in the optical axis direction, H denotes a height perpendicular to the optical axis, R denotes a paraxial curvature radius, k denotes a conic constant, and A4, A6, A8, A10, A12, A14 and A16 denote aspheric surface coefficients.

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16} \quad \text{Equation 1}$$

Next, examples of the imaging lens according to this embodiment will be explained. In each example, f denotes the focal length of the overall optical system of the imaging lens, Fno denotes a F-number, ω denotes a half field of view, ih denotes a maximum image height, TTL denotes total track length, L1R-Sag denotes an amount of sag at the peripheral area of the effective diameter on the image-side surface of the first lens L1, and ED2 denotes an effective diameter of the image-side surface of the first lens L1. Additionally, i denotes surface number counted from the object side, r denotes a curvature radius, d denotes the distance of lenses along the optical axis (surface distance), Nd denotes a refractive index at d-ray (reference wavelength), and vd denotes an abbe number at d-ray. As for aspheric surfaces, an asterisk (*) is added after surface number i.

Example 1

The basic lens data is shown below in Table 1.

TABLE 1

Example1
Unit mm f = 1.88　　　　　　　　　ih = 2.30
Fno = 2.3　　　　　　　　TTL = 4.31
ω (°) = 55.3

Surface Data

| Surface Number i | Curvature Radius r | Surface Distance d | Refractive Index Nd | Abbe Number vd |
|---|---|---|---|---|
| (Object) | Infinity | Infinity | | |
| 1* | Infinity | 0.2568 | 1.535 | 55.66 (vd1) |
| 2* | 4.5177 | 0.4798 | | |
| 3 (Stop) | Infinity | 0.0632 | | |
| 4* | Infinity | 0.5958 | 1.544 | 55.86 (vd2) |
| 5* | −1.2084 | 0.0674 | | |
| 6* | 3.3206 | 0.2361 | 1.661 | 20.37 (vd3) |
| 7* | 1.8521 | 0.2516 | | |
| 8* | −3.3911 | 0.8345 | 1.535 | 55.66 (vd4) |
| 9* | −0.6513 | 0.1591 | | |
| 10* | 2.5945 | 0.4123 | 1.661 | 20.37 (vd5) |
| 11* | 0.6913 | 0.2932 | | |
| 12 | Infinity | 0.1100 | 1.517 | 64.20 |
| 13 | Infinity | 0.5853 | | |
| Image Plane | Infinity | | | |

Constituent Lens Data

| Lens | Start Surface | Focal Length | | |
|---|---|---|---|---|
| 1 | 1 | −8.45 | ED2 = 1.48 | |
| 2 | 4 | 2.22 | L1R-Sag = 0.20 | |
| 3 | 6 | −6.77 | | |
| 4 | 8 | 1.36 | | |
| 5 | 10 | −1.56 | | |

Aspheric Surface Data

| | First Surface | Second Surface | Fourth Surface | Fifth Surface | Sixth Surface | Seventh Surface |
|---|---|---|---|---|---|---|
| k | 0.000000E+00 | 0.000000E+00 | 0.000000E+00 | 0.000000E+00 | 0.000000E+00 | 0.000000E+00 |
| A4 | 4.075078E−01 | 5.527307E−01 | −1.281723E−01 | −3.502152E−02 | −2.474628E−01 | −2.197102E−01 |
| A6 | −3.210729E−01 | 2.472758E−01 | −2.970712E−01 | −4.296651E−01 | −1.491982E−01 | 4.638156E−02 |
| A8 | 2.379824E−01 | −2.801227E+00 | 3.628194E−01 | 1.944490E+00 | 9.354364E−01 | 3.133876E−03 |
| A10 | −5.795117E−02 | 8.432320E+00 | −4.983293E+00 | −7.486488E+00 | −2.442315E+00 | −8.981735E−02 |
| A12 | −6.401284E−02 | −1.189825E+01 | −1.755090E−11 | 1.335492E+01 | 2.869132E+00 | 2.592506E−02 |
| A14 | 2.631158E−02 | 6.288743E+00 | 0.000000E+00 | −1.773782E+01 | −1.633924E+00 | −9.325691E−03 |
| A16 | 0.000000E+00 | 0.000000E+00 | 0.000000E+00 | 9.567404E+00 | 0.000000E+00 | 0.000000E+00 |

| | Eighth Surface | Ninth Surface | Tenth Surface | Eleventh Surface |
|---|---|---|---|---|
| k | 0.000000E+00 | −2.987321E+00 | 0.000000E+00 | −5.217331E+00 |
| A4 | 2.040240E−01 | −1.340013E−01 | −2.087611E−01 | −9.601694E−02 |
| A6 | −2.913462E−02 | 5.507618E−02 | −8.908683E−03 | 1.977222E−02 |
| A8 | −2.178116E−02 | 3.224398E−02 | 8.975630E−03 | −1.723209E−03 |
| A10 | −1.379789E−03 | 2.311330E−02 | −2.940599E−03 | −5.408552E−04 |
| A12 | −3.151513E−03 | −1.080240E−03 | −2.074120E−03 | 5.350480E−05 |
| A14 | 9.701339E−03 | −3.024153E−03 | 6.200900E−04 | 4.044158E−06 |
| A16 | −1.465593E−03 | −1.519940E−03 | 3.987836E−04 | 9.798293E−07 |

The imaging lens in Example 1 satisfies conditional expressions (1) to (19), and (a) to (e) as shown in Table 6.

Figure 2:
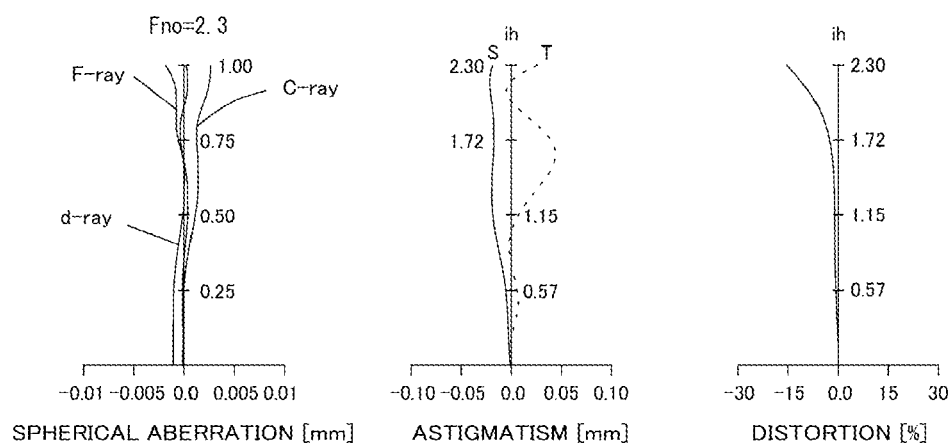
FIG. 2 shows spherical aberration, astigmatism, and distortion of the imaging lens in Example 1 according to the present invention.
Figure 3:
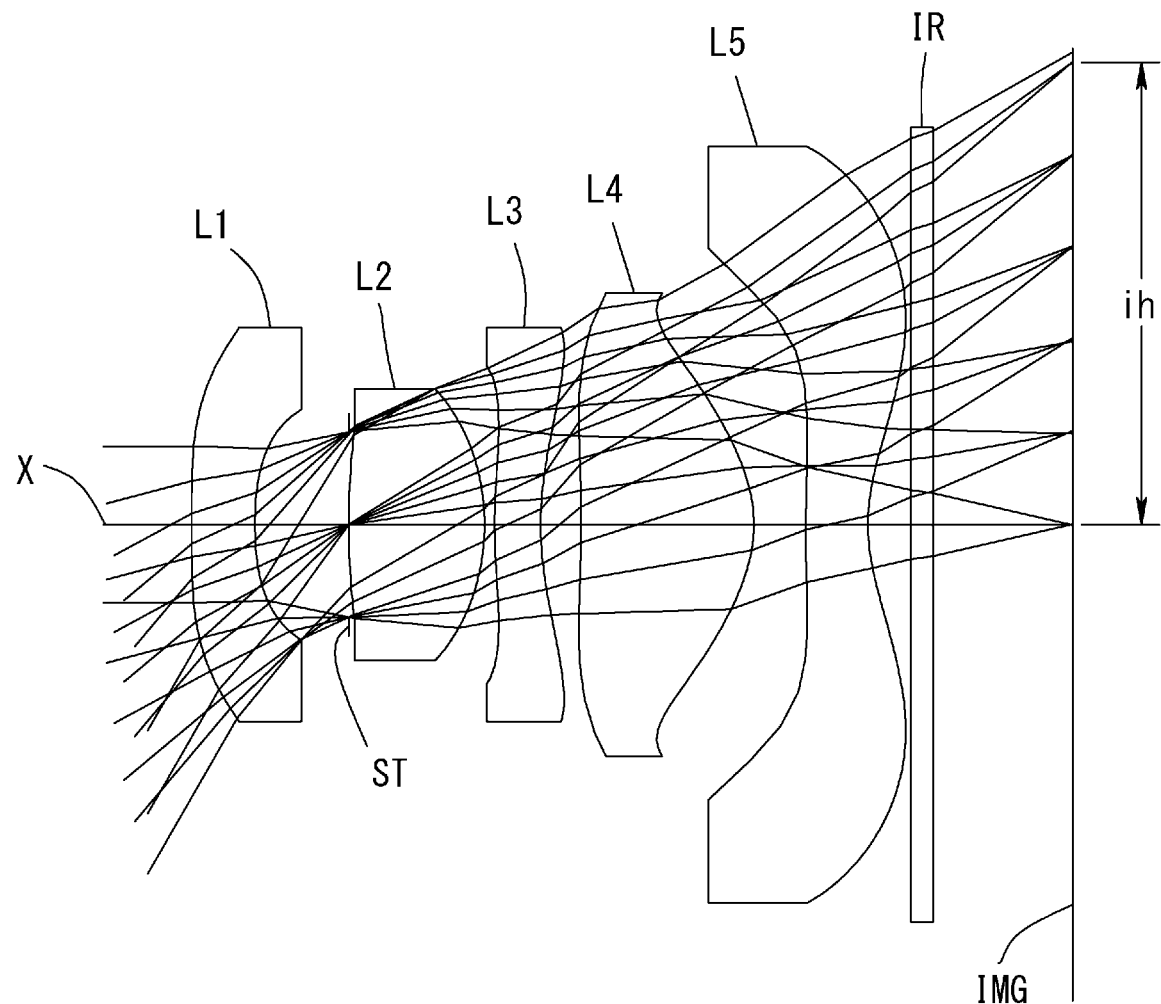
FIG. 3 is a schematic view showing the general configuration of an imaging lens in Example 2 according to the present invention.

FIG. 2 shows spherical aberration (mm), astigmatism (mm), and distortion (%) of the imaging lens in Example 1. The spherical aberration diagram shows the amount of aberration at wavelengths of F-ray (486 nm), d-ray (588 nm), and C-ray (656 nm). The astigmatism diagram shows the amount of aberration at d-ray on a sagittal image surface S (solid line) and on tangential image surface T (broken line), respectively (same as FIGS. 4, 6, 8 and 10). As shown in FIG. 2, each aberration is corrected excellently.

Example 2

The basic lens data is shown below in Table 2.

TABLE 2

Example 2
Unit mm f = 1.76　　　　　　　　　　　　ih = 2.30
Fno = 2.3　　　　　　　　　　　　TTL = 4.34
ω (°) = 60.1

Surface Data

| Surface Number i | Curvature Radius r | Surface Distance d | Refractive Index Nd | Abbe Number vd |
|---|---|---|---|---|
| (Object) | Infinity | Infinity | | |
| 1* | Infinity | 0.3148 | 1.535 | 55.66 (vd1) |
| 2* | 1.6542 | 0.4688 | | |
| 3 (Stop) | Infinity | 0.0011 | | |
| 4* | 4.0480 | 0.6778 | 1.544 | 55.86 (vd2) |
| 5* | −1.1280 | 0.0500 | | |
| 6* | 2.7971 | 0.2300 | 1.661 | 20.37 (vd3) |
| 7* | 1.5654 | 0.2015 | | |
| 8* | −7.5687 | 0.8643 | 1.535 | 55.66 (vd4) |
| 9* | −0.6959 | 0.2595 | | |
| 10* | 7.6208 | 0.3100 | 1.661 | 20.37 (vd5) |
| 11* | 0.8990 | 0.2156 | | |
| 12 | Infinity | 0.1100 | 1.517 | 64.20 |
| 13 | Infinity | 0.6916 | | |
| Image Plane | Infinity | | | |

Constituent Lens Data

| Lens | Start Surface | Focal Length | | |
|---|---|---|---|---|
| 1 | 1 | −3.09 | ED2 = 1.15 | |
| 2 | 4 | 1.70 | L1R-Sag = 0.23 | |
| 3 | 6 | −5.81 | | |
| 4 | 8 | 1.37 | | |
| 5 | 10 | −1.57 | | |

Aspheric Surface Data

| | First Surface | Second Surface | Fourth Surface | Fifth Surface | Sixth Surface | Seventh Surface |
|---|---|---|---|---|---|---|
| k | 0.000000E+00 | 0.000000E+00 | 0.000000E+00 | 0.000000E+00 | 0.000000E+00 | 0.000000E+00 |
| A4 | 4.654379E−01 | 9.214608E−01 | −4.273832E−02 | 2.126795E−02 | −3.234927E−01 | −3.218384E−01 |
| A6 | −3.818411E−01 | 1.987624E−01 | 8.005231E−01 | −8.592728E−01 | −5.946656E−01 | 9.876335E−02 |
| A8 | 2.270034E−01 | 8.733486E−01 | −4.465986E+00 | 2.534736E+00 | 2.750419E+00 | 8.165333E−02 |
| A10 | 1.666373E−02 | −2.371458E+00 | 7.433833E+00 | −2.872225E+00 | −6.169858E+00 | −1.269022E−01 |
| A12 | −7.695727E−02 | 1.728032E+01 | 1.770000E−14 | 1.783400E−12 | 7.708193E+00 | −8.947142E−04 |
| A14 | 0.000000E+00 | 0.000000E+00 | 0.000000E+00 | 0.000000E+00 | −4.649151E+00 | 3.857100E−12 |
| A16 | 0.000000E+00 | 0.000000E+00 | 0.000000E+00 | 0.000000E+00 | 0.000000E+00 | 0.000000E+00 |

| | Eighth Surface | Ninth Surface | Tenth Surface | Eleventh Surface |
|---|---|---|---|---|
| k | 0.000000E+00 | −2.669377E+00 | 0.000000E+00 | −6.588652E+00 |
| A4 | 1.037902E−01 | −5.325785E−02 | −1.275770E−01 | −1.271290E−01 |
| A6 | 3.379147E−02 | −8.471565E−03 | −8.210974E−02 | 3.286294E−02 |
| A8 | −9.341161E−03 | −4.795263E−02 | 3.659173E−03 | −1.019513E−02 |
| A10 | −1.246479E−02 | 1.016441E−01 | 7.824618E−03 | 1.882715E−03 |
| A12 | −2.401116E−02 | 2.429943E−03 | 3.905240E−03 | 2.137074E−04 |

TABLE 2-continued

Example 2
Unit mm

| | | | | |
|---|---|---|---|---|
| A14 | 5.063288E−02 | 9.414709E−03 | 7.661677E−04 | −1.282882E−04 |
| A16 | −2.125843E−02 | −1.319167E−02 | −5.847351E−04 | 8.277415E−06 |

The imaging lens in Example 2 satisfies conditional expressions (1) to (19), and (a) to (e) as shown in Table 6.

Figure 4:
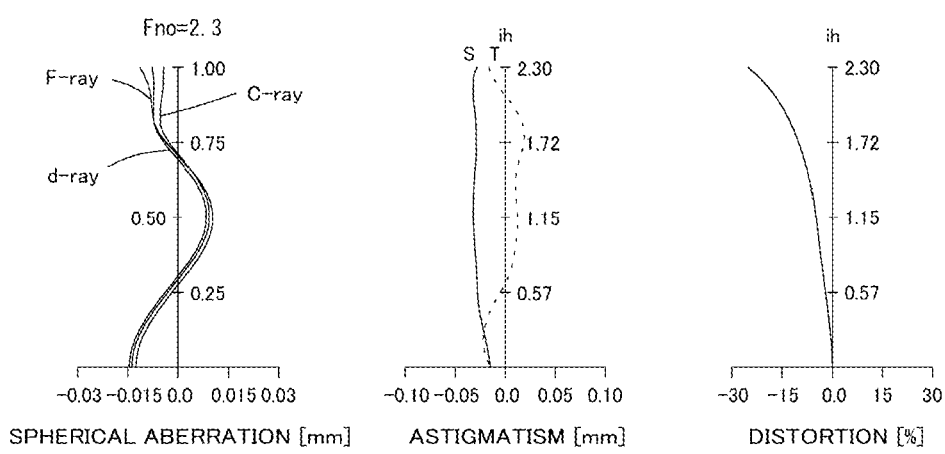
FIG. 4 shows spherical aberration, astigmatism, and distortion of the imaging lens in Example 2 according to the present invention.
Figure 5:
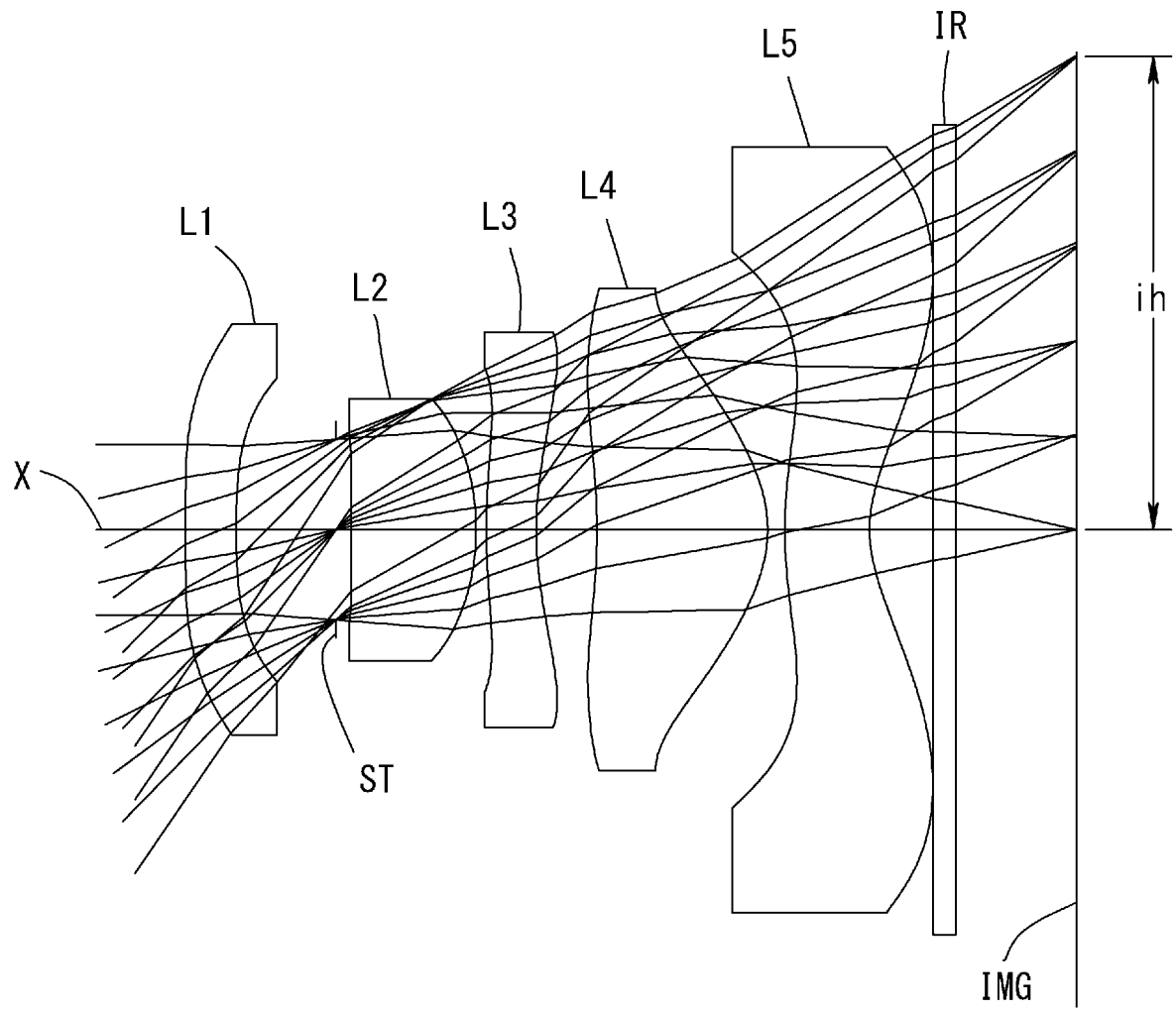
FIG. 5 is a schematic view showing the general configuration of an imaging lens in Example 3 according to the present invention.

FIG. 4 shows spherical aberration (mm), astigmatism (mm), and distortion (%) of the imaging lens in Example 2. As shown in FIG. 4, each aberration is corrected excellently.

Example 3

The basic lens data is shown below in Table 3.

TABLE 3

Example 3
Unit mm f = 1.88          ih = 2.30
Fno = 2.3         TTL = 4.31
ω (°) = 55.6

Surface Data

| Surface Number i | Curvature Radius r | Surface Distance d | Refractive Index Nd | Abbe Number νd |
|---|---|---|---|---|
| (Object) | Infinity | Infinity | | |
| 1* | Infinity | 0.2481 | 1.535 | 55.66 (vd1) |
| 2* | 4.7974 | 0.4864 | | |
| 3 (Stop) | Infinity | 0.0756 | | |
| 4* | Infinity | 0.6091 | 1.544 | 55.86 (vd2) |
| 5* | −1.1558 | 0.0500 | | |
| 6* | 3.0825 | 0.2439 | 1.661 | 20.37 (vd3) |
| 7* | 1.8028 | 0.2962 | | |
| 8* | −2.7778 | 0.8339 | 1.535 | 55.66 (vd4) |
| 9* | −0.6164 | 0.0835 | | |
| 10* | 2.2275 | 0.4123 | 1.661 | 20.37 (vd5) |
| 11* | 0.6260 | 0.3110 | | |
| 12 | Infinity | 0.1100 | 1.517 | 64.20 |
| 13 | Infinity | 0.5850 | | |
| Image Plane | Infinity | | | |

Constituent Lens Data

| Lens | Start Surface | Focal Length | | |
|---|---|---|---|---|
| 1 | 1 | −8.97 | ED2 = 1.48 | |
| 2 | 4 | 2.12 | L1R-Sag = 0.20 | |
| 3 | 6 | −7.11 | | |
| 4 | 8 | 1.31 | | |
| 5 | 10 | −1.47 | | |

Aspheric Surface Data

| | First Surface | Second Surface | Fourth Surface | Fifth Surface | Sixth Surface | Seventh Surface |
|---|---|---|---|---|---|---|
| k | 0.000000E+00 | 0.000000E+00 | 0.000000E+00 | 0.000000E+00 | 0.000000E+00 | 0.000000E+00 |
| A4 | 4.059552E−01 | 5.503921E−01 | −1.290856E−01 | −3.540881E−02 | −2.459560E−01 | −2.204086E−01 |
| A6 | −3.224134E−01 | 2.184241E−01 | −2.945636E−01 | −4.234039E−01 | −1.462461E−01 | 4.549858E−02 |
| A8 | 2.302280E−01 | −2.815110E+00 | 3.529981E−01 | 1.969118E+00 | 9.258197E−01 | 5.741983E−03 |
| A10 | −4.743223E−02 | 8.605305E+00 | −4.686549E+00 | −7.414402E+00 | −2.428746E+00 | −8.750047E−02 |
| A12 | −6.401284E−02 | −1.189825E+01 | −1.754940E−11 | 1.335492E+01 | 2.869132E+00 | 2.592506E−02 |
| A14 | 2.631158E−02 | 6.288743E+00 | 0.000000E+00 | −1.773782E+01 | −1.633924E+00 | −9.325691E−03 |
| A16 | 0.000000E+00 | 0.000000E+00 | 0.000000E+00 | 9.567404E+00 | 0.000000E+00 | 0.000000E+00 |

| | Eighth Surface | Ninth Surface | Tenth Surface | Eleventh Surface |
|---|---|---|---|---|
| k | 0.000000E+00 | −3.126439E+00 | 0.000000E+00 | −5.026717E+00 |
| A4 | 2.020024E−01 | −1.368117E−01 | −2.353418E−01 | −9.658245E−02 |
| A6 | −2.392408E−02 | 5.011033E−02 | −5.806997E−03 | 1.863431E−02 |
| A8 | −1.934852E−02 | 2.856037E−02 | 7.791330E−03 | −8.691693E−04 |
| A10 | −2.396617E−03 | 2.045263E−02 | −1.551840E−03 | −7.186789E−04 |
| A12 | −4.570524E−03 | −2.645529E−03 | −1.325272E−03 | 5.086275E−05 |

TABLE 3-continued

Example 3
Unit mm

| | | | | |
|---|---|---|---|---|
| A14 | 8.177319E−03 | −3.052112E−03 | 6.260107E−04 | 4.546487E−06 |
| A16 | −8.888745E−04 | −7.328891E−04 | 1.526873E−04 | 2.362930E−06 |

The imaging lens in Example 3 satisfies conditional expressions (1) to (19), and (a) to (e) as shown in Table 6.

Figure 6:
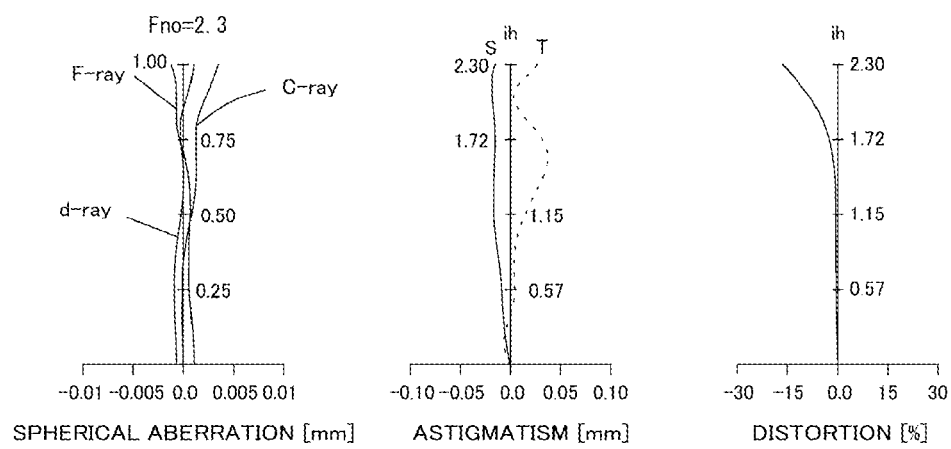
FIG. 6 shows spherical aberration, astigmatism, and distortion of the imaging lens in Example 3 according to the present invention.
Figure 7:
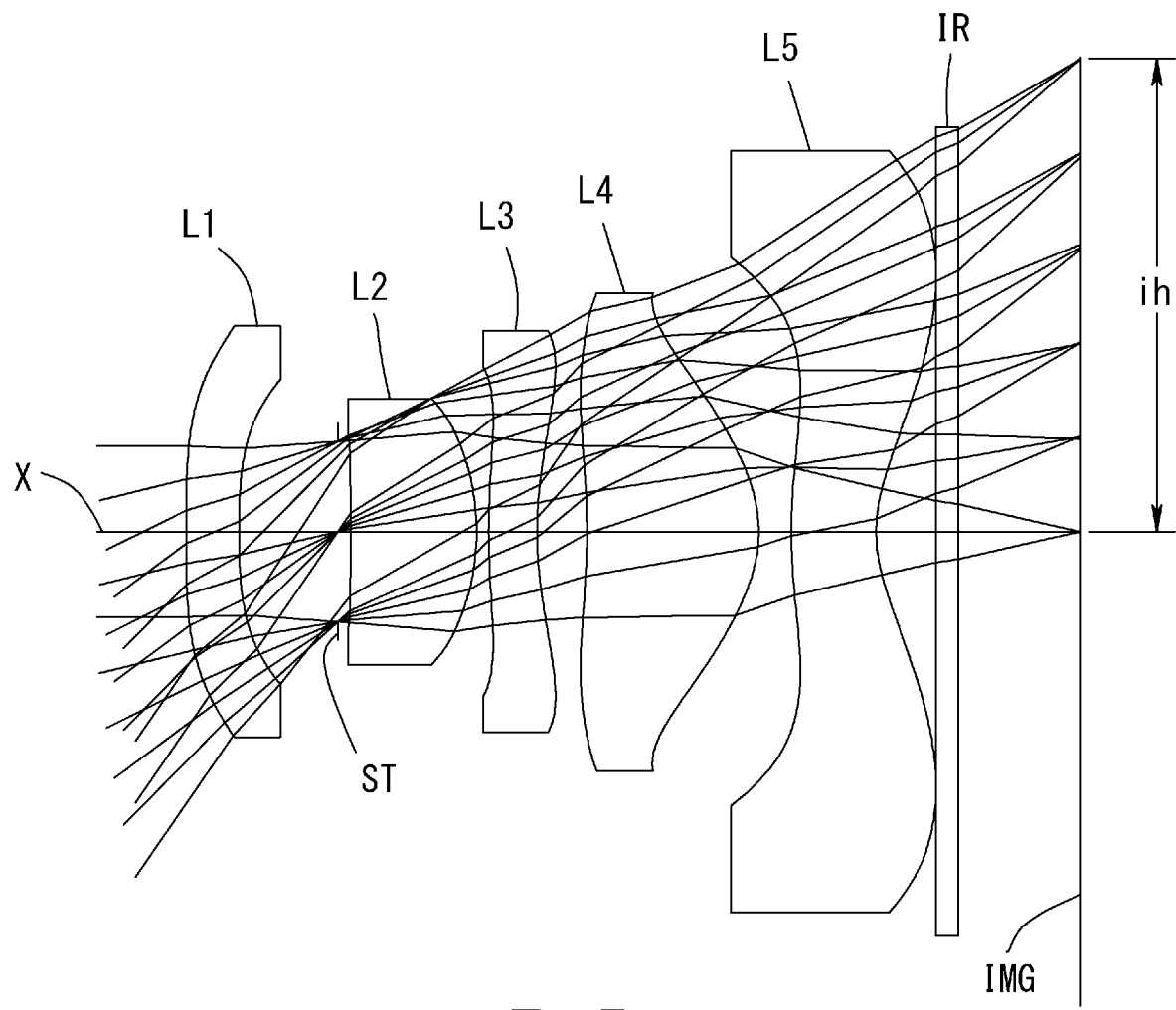
FIG. 7 is a schematic view showing the general configuration of an imaging lens in Example 4 according to the present invention.

FIG. 6 shows spherical aberration (mm), astigmatism (mm), and distortion (%) of the imaging lens in Example 3. As shown in FIG. 6, each aberration is corrected excellently.

Example 4

The basic lens data is shown below in Table 4.

TABLE 4

Example 4
Unit mm f = 1.88  ih = 2.30
Fno = 2.3  TTL = 4.31
ω (°) = 55.4

Surface Data

| Surface Number i | Curvature Radius r | Surface Distance d | Refractive Index Nd | Abbe Number νd |
|---|---|---|---|---|
| (Object) | Infinity | Infinity | | |
| 1* | 50000.0000 | 0.2555 | 1.535 | 55.66 (vd1) |
| 2* | 4.6208 | 0.4811 | | |
| 3 (Stop) | Infinity | 0.0628 | | |
| 4* | Infinity | 0.6118 | 1.544 | 55.86 (vd2) |
| 5* | −1.2083 | 0.0601 | | |
| 6* | 3.4176 | 0.2358 | 1.661 | 20.37 (vd3) |
| 7* | 1.9098 | 0.2433 | | |
| 8* | −3.3031 | 0.8361 | 1.535 | 55.66 (vd4) |
| 9* | −0.6476 | 0.1588 | | |
| 10* | 2.6555 | 0.4123 | 1.661 | 20.37 (vd5) |
| 11* | 0.6868 | 0.2922 | | |
| 12 | Infinity | 0.1100 | 1.517 | 64.20 |
| 13 | Infinity | 0.5853 | | |
| Image Plane | Infinity | | | |

Constituent Lens Data

| Lens | Start Surface | Focal Length | | |
|---|---|---|---|---|
| 1 | 1 | −8.64 | ED2 = 1.48 | |
| 2 | 4 | 2.22 | L1R-Sag = 0.20 | |
| 3 | 6 | −6.99 | | |
| 4 | 8 | 1.36 | | |
| 5 | 10 | −1.53 | | |

Aspheric Surface Data

| | First Surface | Second Surface | Fourth Surface | Fifth Surface | Sixth Surface | Seventh Surface |
|---|---|---|---|---|---|---|
| k | 0.000000E+00 | 0.000000E+00 | 0.000000E+00 | 0.000000E+00 | 0.000000E+00 | 0.000000E+00 |
| A4 | 4.105095E−01 | 5.550665E−01 | −1.256969E−01 | −2.957236E−02 | −2.474477E−01 | −2.200098E−01 |
| A6 | −3.187898E−01 | 2.514082E−01 | −2.902973E−01 | −4.219707E−01 | −1.490280E−01 | 4.994203E−02 |
| A8 | 2.378319E−01 | −2.793401E+00 | 3.398346E−01 | 1.964177E+00 | 9.495800E−01 | 1.064880E−03 |
| A10 | −5.814225E−02 | 8.409688E+00 | −4.694887E+00 | −7.461296E+00 | −2.478092E+00 | −9.378248E−02 |
| A12 | −6.401283E−02 | −1.189825E+01 | −1.755140E−11 | 1.335492E+01 | 2.869132E+00 | 2.592505E−02 |
| A14 | 2.631158E−02 | 6.288743E+00 | 0.000000E+00 | −1.773782E+01 | −1.633924E+00 | −9.325692E−03 |
| A16 | 0.000000E+00 | 0.000000E+00 | 0.000000E+00 | 9.567404E+00 | 0.000000E+00 | 0.000000E+00 |

| | Eighth Surface | Ninth Surface | Tenth Surface | Eleventh Surface |
|---|---|---|---|---|
| k | 0.000000E+00 | −2.963167E+00 | 0.000000E+00 | −5.217340E+00 |
| A4 | 2.039792E−01 | −1.339758E−01 | −2.204477E−01 | −1.048087E−01 |
| A6 | −3.182333E−02 | 5.358069E−02 | −1.380856E−03 | 2.886538E−02 |
| A8 | −2.125742E−02 | 3.189312E−02 | 8.931776E−03 | −4.442541E−03 |
| A10 | −1.391530E−03 | 2.380943E−02 | −4.713270E−03 | −4.914906E−04 |
| A12 | −2.756319E−03 | −7.877977E−04 | −1.931030E−03 | 1.372065E−04 |

TABLE 4-continued

Example 4
Unit mm

| | | | | |
|---|---|---|---|---|
| A14 | 8.895767E−03 | −3.040199E−03 | 6.091021E−04 | 0.000000E+00 |
| A16 | −1.483016E−03 | −2.301546E−03 | 3.932583E−04 | 0.000000E+00 |

The imaging lens in Example 4 satisfies conditional expressions (1) to (19), and (a) to (e) as shown in Table 6.

Figure 8:
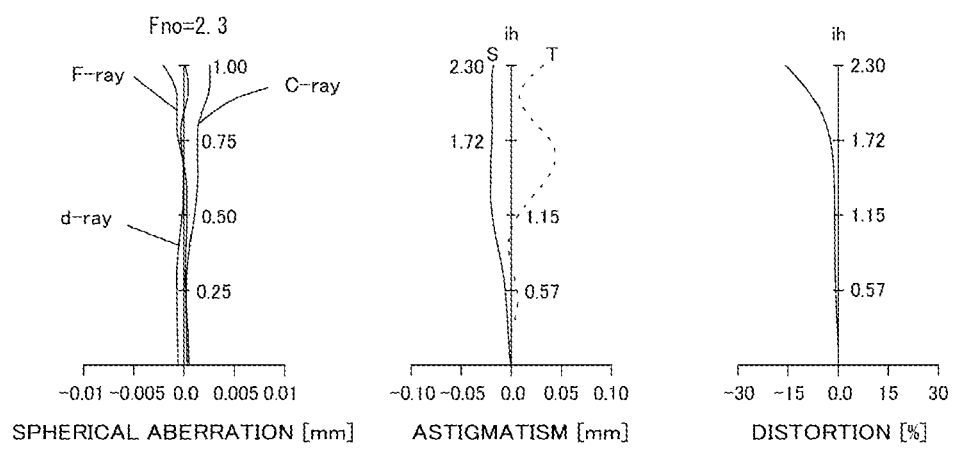
FIG. 8 shows spherical aberration, astigmatism, and distortion of the imaging lens in Example 4 according to the present invention.
Figure 9:
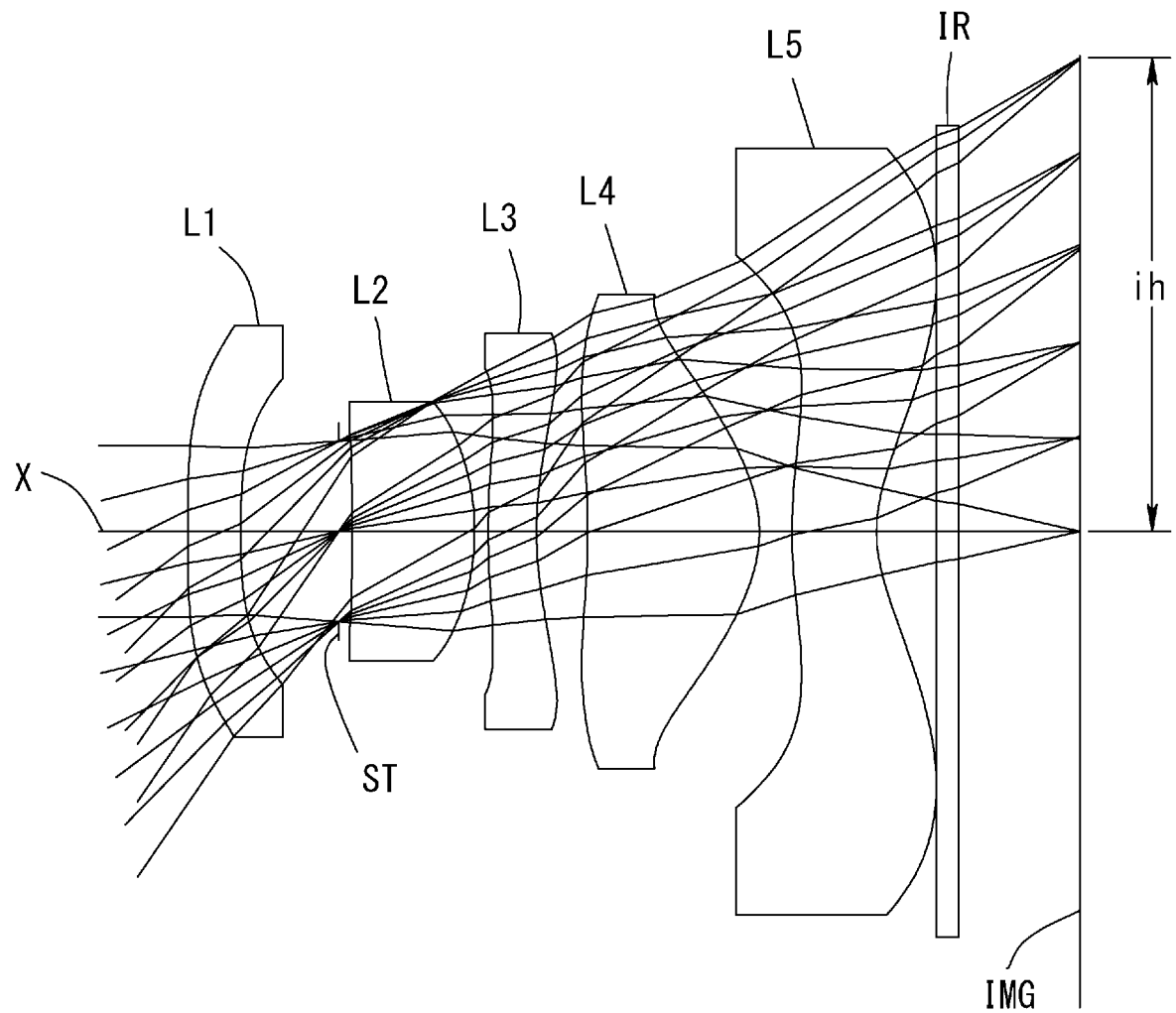
FIG. 9 is a schematic view showing the general configuration of an imaging lens in Example 5 according to the present invention.

FIG. 8 shows spherical aberration (mm), astigmatism (mm), and distortion (%) of the imaging lens in Example 4. As shown in FIG. 8, each aberration is corrected excellently.

Example 5

The basic lens data is shown below in Table 5.

TABLE 5

Example 5
Unit mm f = 1.88　　　　　　　　　ih = 2.30
Fno = 2.3　　　　　　　　　TTL = 4.31
ω (°) = 55.5

Surface Data

| Surface Number i | Curvature Radius r | Surface Distance d | Refractive Index Nd | Abbe Number vd |
|---|---|---|---|---|
| (Object) | Infinity | Infinity | | |
| 1* | −50047.7300 | 0.2565 | 1.535 | 55.66 (vd1) |
| 2* | 4.4995 | 0.4798 | | |
| 3 (Stop) | Infinity | 0.0632 | | |
| 4* | Infinity | 0.5979 | 1.544 | 55.86 (vd2) |
| 5* | −1.2085 | 0.0663 | | |
| 6* | 3.2109 | 0.2360 | 1.661 | 20.37 (vd3) |
| 7* | 1.8214 | 0.2503 | | |
| 8* | −3.3776 | 0.8368 | 1.535 | 55.66 (vd4) |
| 9* | −0.6513 | 0.1590 | | |
| 10* | 2.5933 | 0.4123 | 1.661 | 20.37 (vd5) |
| 11* | 0.6901 | 0.2919 | | |
| 12 | Infinity | 0.1100 | 1.517 | 64.20 |
| 13 | Infinity | 0.5853 | | |
| Image Plane | Infinity | | | |

Constituent Lens Data

| Lens | Start Surface | Focal Length | | |
|---|---|---|---|---|
| 1 | 1 | −8.41 | ED2 = 1.48 | |
| 2 | 4 | 2.22 | L1R-Sag = 0.20 | |
| 3 | 6 | −6.83 | | |
| 4 | 8 | 1.36 | | |
| 5 | 10 | −1.56 | | |

Aspheric Surface Data

| | First Surface | Second Surface | Fourth Surface | Fifth Surface | Sixth Surface | Seventh Surface |
|---|---|---|---|---|---|---|
| k | 0.000000E+00 | 0.000000E+00 | 0.000000E+00 | 0.000000E+00 | 0.000000E+00 | 0.000000E+00 |
| A4 | 4.078150E−01 | 5.527471E−01 | −1.257794E−01 | −3.310723E−02 | −2.474569E−01 | −2.226701E−01 |
| A6 | −3.226339E−01 | 2.473070E−01 | −2.964644E−01 | −4.265178E−01 | −1.491749E−01 | 4.741521E−02 |
| A8 | 2.376130E−01 | −2.801267E+00 | 3.783289E−01 | 1.938538E+00 | 9.354945E−01 | 3.228709E−03 |
| A10 | −5.694602E−02 | 8.432161E+00 | −4.967681E+00 | −7.472022E+00 | −2.442175E+00 | −9.019716E−02 |
| A12 | −6.401284E−02 | −1.189825E+01 | −1.755090E−11 | 1.335492E+01 | 2.869132E+00 | 2.592506E−02 |
| A14 | 2.631158E−02 | 6.288743E+00 | 0.000000E+00 | −1.773782E+01 | −1.633924E+00 | −9.325691E−03 |
| A16 | 0.000000E+00 | 0.000000E+00 | 0.000000E+00 | 9.567404E+00 | 0.000000E+00 | 0.000000E+00 |

| | Eighth Surface | Ninth Surface | Tenth Surface | Eleventh Surface |
|---|---|---|---|---|
| k | 0.000000E+00 | −2.983373E+00 | 0.000000E+00 | −5.217413E+00 |
| A4 | 2.040155E−01 | −1.339910E−01 | −2.183616E−01 | −1.005765E−01 |
| A6 | −3.040320E−02 | 5.422087E−02 | −3.910626E−03 | 2.381574E−02 |
| A8 | −2.263929E−02 | 3.137722E−02 | 8.975682E−03 | −2.402281E−03 |
| A10 | −4.059439E−04 | 2.353750E−02 | −3.161193E−03 | −8.905137E−04 |
| A12 | −3.153476E−03 | −1.080218E−03 | −2.177761E−03 | 1.723331E−04 |

TABLE 5-continued

Example 5
Unit mm

| | | | | |
|---|---|---|---|---|
| A14 | 9.700197E−03 | −3.082856E−03 | 6.200943E−04 | 0.000000E+00 |
| A16 | −1.619099E−03 | −1.519205E−03 | 3.987865E−04 | 0.000000E+00 |

The imaging lens in Example 4 satisfies conditional expressions (1) to (19), and (a) to (e) as shown in Table 6.

Figure 10:
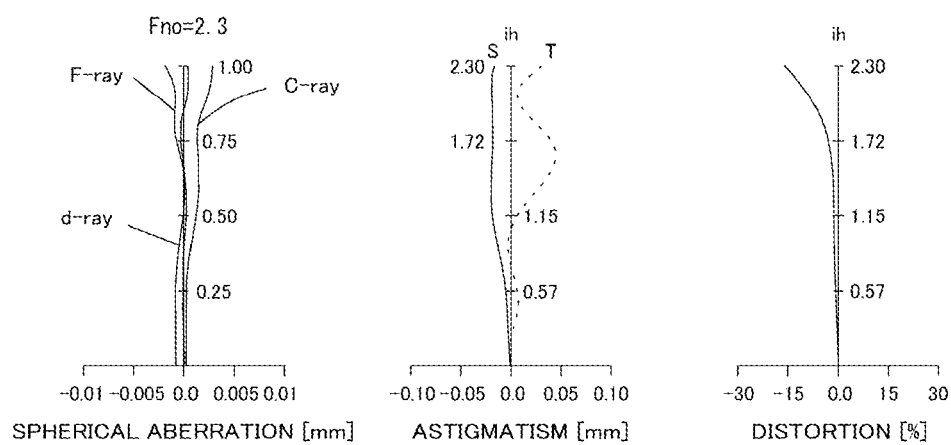
FIG. 10 shows spherical aberration, astigmatism, and distortion of the imaging lens in Example 5 according to the present invention.
Figure 11:
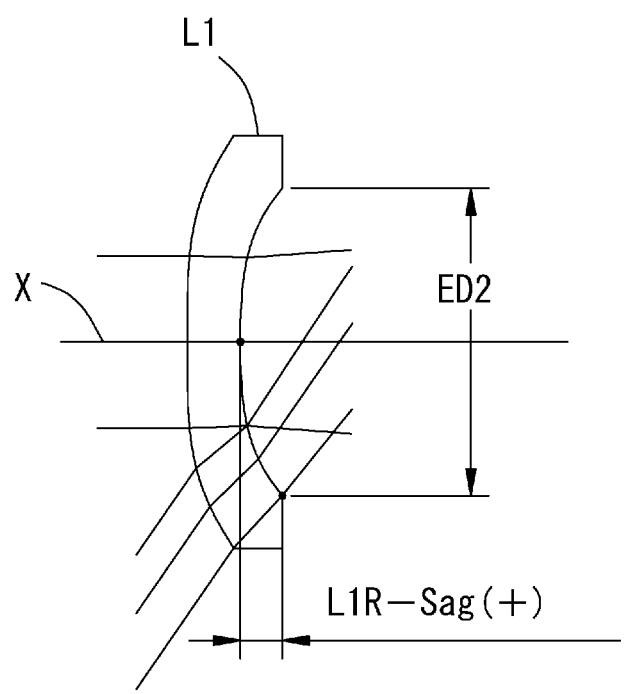
FIG. 11 illustrates amount of sag L1R-Sag at the peripheral area of the effective diameter on the image-side surface of the first lens and an effective diameter ED2 according to the present invention.

FIG. 10 shows spherical aberration (mm), astigmatism (mm), and distortion (%) of the imaging lens in Example 5. As shown in FIG. 10, each aberration is corrected excellently.

In table 6, values of conditional expressions conditional expressions (1) to (19), and (a) to (e) related to the Examples 1 to 5 are shown.

TABLE 6

| | Example1 | Example2 | Example3 | Example4 | Example5 |
|---|---|---|---|---|---|
| Conditional Expression (1) $(N1 - 1)/(r1 \times f) \times 1000$ | 2.85E−08 | 3.04E−08 | 2.85E−08 | 5.69E−03 | −5.68E−03 |
| Conditional Expression (2) $|r9|/f$ | 1.38 | 4.33 | 1.19 | 1.41 | 1.38 |
| Conditional Expression (3) $(N2 - 1)/(r3 \times f) \times 1000$ | 2.90E−08 | 76.32 | 2.90E−08 | 2.90E−08 | 2.90E−08 |
| Conditional Expression (4) $f2/f$ | 1.18 | 0.96 | 1.13 | 1.18 | 1.18 |
| Conditional Expression (5) $|f3|/f$ | 3.60 | 3.30 | 3.78 | 3.72 | 3.63 |
| Conditional Expression (6) $f4/f$ | 0.72 | 0.78 | 0.69 | 0.72 | 0.73 |
| Conditional Expression (7) $f5/f$ | −0.83 | −0.89 | −0.78 | −0.81 | −0.83 |
| Conditional Expression (8) $(vd1 + vd2)/2 - vd3$ | 35.40 | 35.40 | 35.40 | 35.40 | 35.40 |
| Conditional Expression (9) $|vd4 - vd5|$ | 35.30 | 35.30 | 35.30 | 35.30 | 35.30 |
| Conditional Expression (10) $r7/r8$ | 5.21 | 10.88 | 4.51 | 5.10 | 5.19 |
| Conditional Expression (11) $r10/f$ | 0.37 | 0.51 | 0.33 | 0.37 | 0.37 |
| Conditional Expression (12) $(t1/f) \times 100$ | 28.89 | 26.67 | 29.90 | 28.94 | 28.89 |
| Conditional Expression (13) $(r2 \times 2)/f1$ | −1.07 | −1.07 | −1.07 | −1.07 | −1.07 |
| Conditional Expression (14) $d2/f$ | 0.32 | 0.38 | 0.32 | 0.33 | 0.32 |
| Conditional Expression (15) $d4/f$ | 0.44 | 0.49 | 0.44 | 0.44 | 0.45 |
| Conditional Expression (16) $f12/f$ | 1.39 | 1.34 | 1.30 | 1.39 | 1.40 |
| Conditional Expression (17) $TTL/(2 \times ih)$ | 0.94 | 0.95 | 0.94 | 0.94 | 0.94 |
| Conditional Expression (18) $(t4/f) \times 100$ | 8.47 | 14.73 | 4.45 | 8.45 | 8.46 |
| Conditional Expression (19) $L1R - Sag/ED2$ | 0.14 | 0.20 | 0.14 | 0.14 | 0.14 |
| Conditional Expression (a) $|r1| > |r2|$ | YES | YES | YES | YES | YES |
| Conditional Expression (b) $|r3| > |r4|$ | YES | YES | YES | YES | YES |
| Conditional Expression (c) $|r5| > |r6|$ | YES | YES | YES | YES | YES |
| Conditional Expression (d) $|r7| > |r8|$ | YES | YES | YES | YES | YES |
| Conditional Expression (e) $|r9| > |r10|$ | YES | YES | YES | YES | YES |

When the imaging lens according to the present invention is adopted to a product with the camera function, there is realized contribution to the wide field of view, the low-profileness and the low F-number of the camera and high performance thereof.

DESCRIPTION OF REFERENCE NUMERALS

ST: aperture stop,
L1: first lens,
L2: second lens,
L3: third lens,
L4: fourth lens,
L5: fifth lens,
IMG: image plane,
IR: filter,
ih: maximum image height.

What is claimed is:

1. An imaging lens comprising in order from an object side to an image side,
   a first lens having negative refractive power,
   an aperture stop,
   a second lens,
   a third lens being a double-aspheric lens,
   a fourth lens having positive refractive power, and
   a fifth lens being a double-sided aspheric lens, wherein a below conditional expression (1) is satisfied:

$$-0.07 < (N1-1)/(r1 \times f) \times 1000 < 0.07 \quad (1)$$

where
N1: refractive index at d-ray of the first lens,
r1: curvature radius of the object-side surface of the first lens (mm),
f: focal length of the overall optical system (mm).

2. The imaging lens according to claim 1, wherein said second lens has positive refractive power and an image-side surface thereof is a convex surface near the optical axis.

3. The imaging lens according to claim 1, wherein said fifth lens has negative refractive power and has at least one off-axial pole point on the image-side surface thereof.

4. The imaging lens according to claim 1, wherein said third lens has at least one off-axial pole point on the object-side surface or the image-side surface thereof.

5. The imaging lens according to claim 1, wherein a below conditional expression (2) is satisfied:

$$0.8 < |r9|/f < 7.0 \quad (2)$$

where
r9: curvature radius of the object-side surface of the fifth lens (mm).

6. The imaging lens according to claim 1, wherein a below conditional expression (3) is satisfied:

$$-0.07 < (N2-1)/(r3 \times f) \times 1000 < 90.0 \quad (3)$$

where
N2: refractive index at d-ray of the second lens,
r3: curvature radius of the object-side surface of the second lens (mm).

7. The imaging lens according to claim 1, wherein a below conditional expression (4) is satisfied:

$$0.6 < f2/f < 1.5 \quad (4)$$

where
f2: focal length of the second lens (mm).

8. The imaging lens according to claim 1, wherein a below conditional expression (5) is satisfied:

$$2.5 < |f3|/f \quad (5)$$

where
f3: focal length of the third lens (mm).

9. The imaging lens according to claim 1, wherein a below conditional expression (6) is satisfied:

$$0.5 < f4/f < 1.1 \quad (6)$$

where
f4: focal length of the fourth lens (mm).

10. The imaging lens according to claim 1, wherein a below conditional expression (7) is satisfied:

$$-1.2 < f5/f < -0.5 \quad (7)$$

where
f5: focal length of the fifth lens (mm).

11. The imaging lens according to claim 1, wherein a below conditional expression (8) is satisfied:

$$20 < (vd1+vd2)/2 - vd3 < 50 \quad (8)$$

where
vd1: abbe number at d-ray of the first lens,
vd2: abbe number at d-ray of the second lens,
vd3: abbe number at d-ray of the third lens.

12. The imaging lens according to claim 1, wherein a below conditional expression (9) is satisfied:

$$20 < |vd4-vd5| < 50 \quad (9)$$

where
vd4: abbe number at d-ray of the fourth lens,
vd5: abbe number at d-ray of the fifth lens.

13. The imaging lens according to claim 1, wherein the image-side surface of said fourth lens is convex near the optical axis, and a below conditional expression (10) is satisfied:

$$2.3 < r7/r8 < 14.0 \quad (10)$$

where
r7: curvature radius of the object-side surface of the fourth lens (mm),
r8: curvature radius of the image-side surface of the fourth lens (mm).

14. The imaging lens according to claim 1, wherein the image-side surface of said fifth lens is concave near the optical axis, and a below conditional expression (11) is satisfied:

$$0.2 < r10/f < 0.7 \quad (11)$$

where
r10: curvature radius of the image-side surface of the fifth lens (mm).

15. The imaging lens according to claim 1, wherein a below conditional expression (12) is satisfied:

$$20 < (t1/f) \times 100 < 35 \quad (12)$$

where
t1: distance along the optical axis from the image-side surface of the first lens to the object-side surface of the second lens.

16. The imaging lens according to claim 1, wherein the image-side surface of said first lens is concave near the optical axis, and a below conditional expression (13) is satisfied:

$$-1.3 < (r2 \times 2)/f1 < -0.8 \quad (13)$$

where
r2: curvature radius of the image-side surface of the first lens (mm),
f1: focal length of the first lens (mm).

17. The imaging lens according to claim 1, wherein a below conditional expression (14) is satisfied:

$$0.2 < d2/f < 0.5 \tag{14}$$

where
d2: thickness along the optical axis of the second lens (mm).

18. The imaging lens according to claim 1, wherein a below conditional expression (15) is satisfied:

$$0.30 < d4/f < 0.65 \tag{15}$$

where
d4: thickness along the optical axis of the fourth lens (mm).

19. The imaging lens according to claim 1, wherein a below conditional expression (16) is satisfied:

$$1.0 < f12/f < 2.0 \tag{16}$$

where
f12: composite focal length of the first lens and the second lens (mm).

* * * * *